May 26, 1953 H. E. ROSE ET AL 2,639,493
TRANSFER MACHINE
Filed March 12, 1948 14 Sheets-Sheet 7

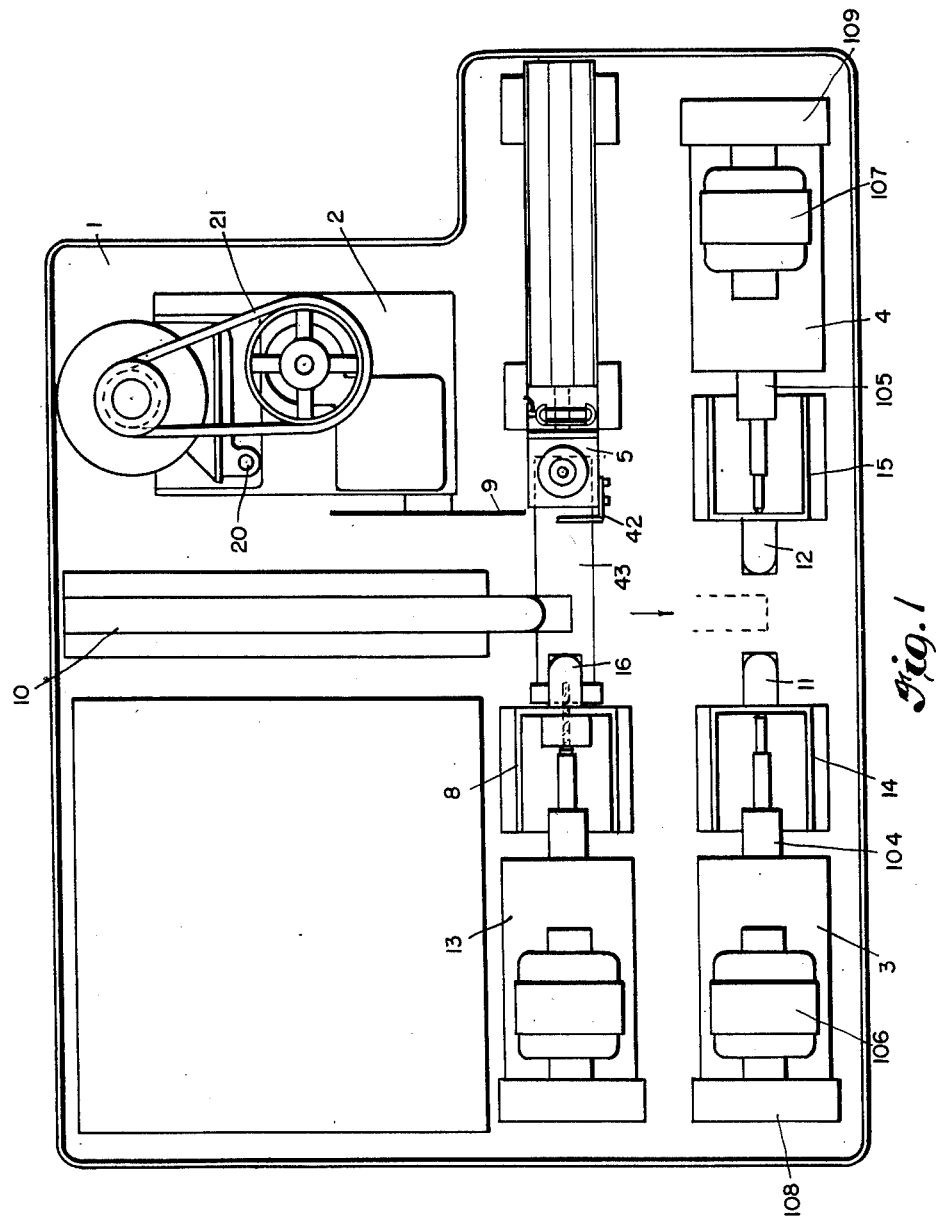

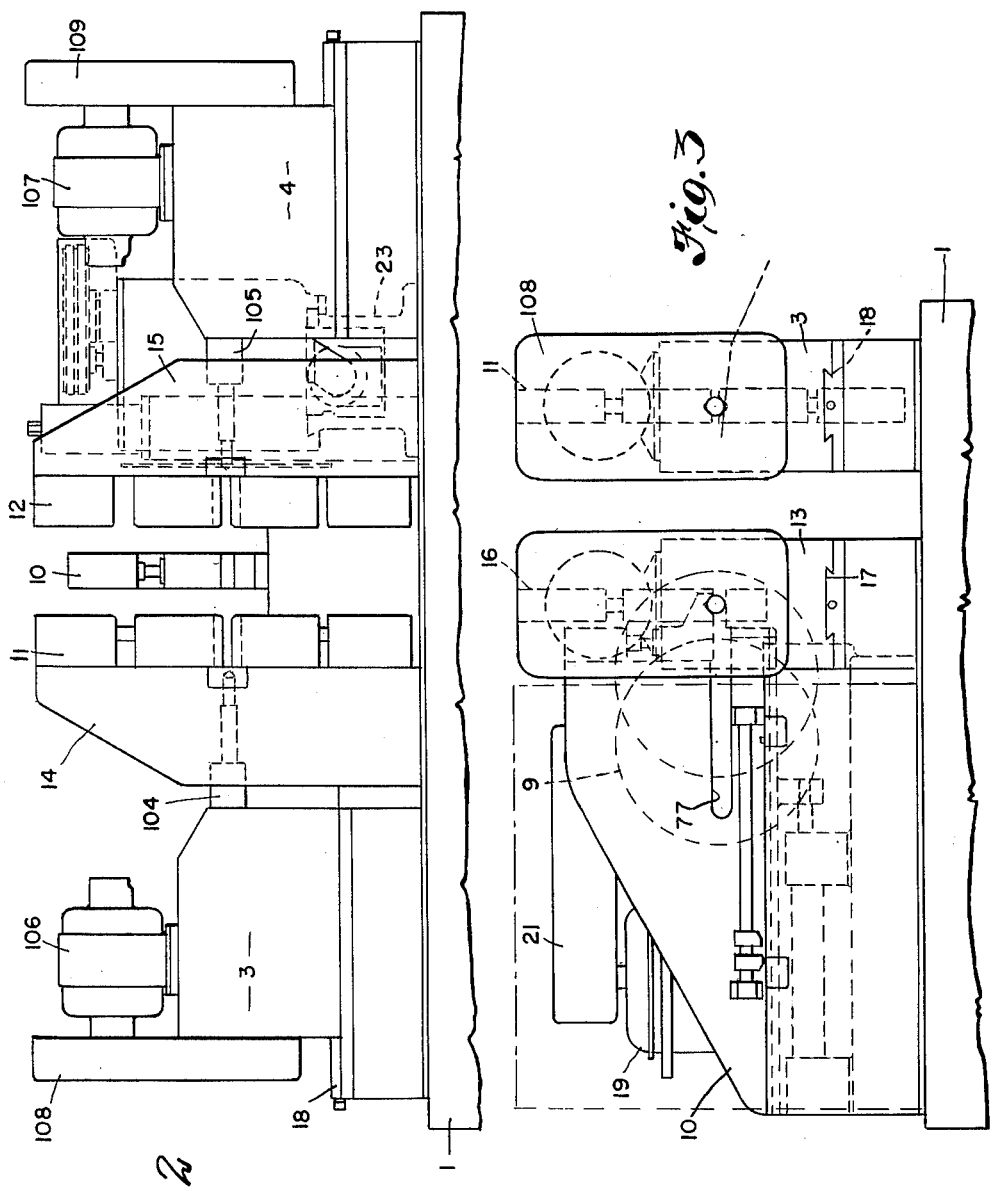

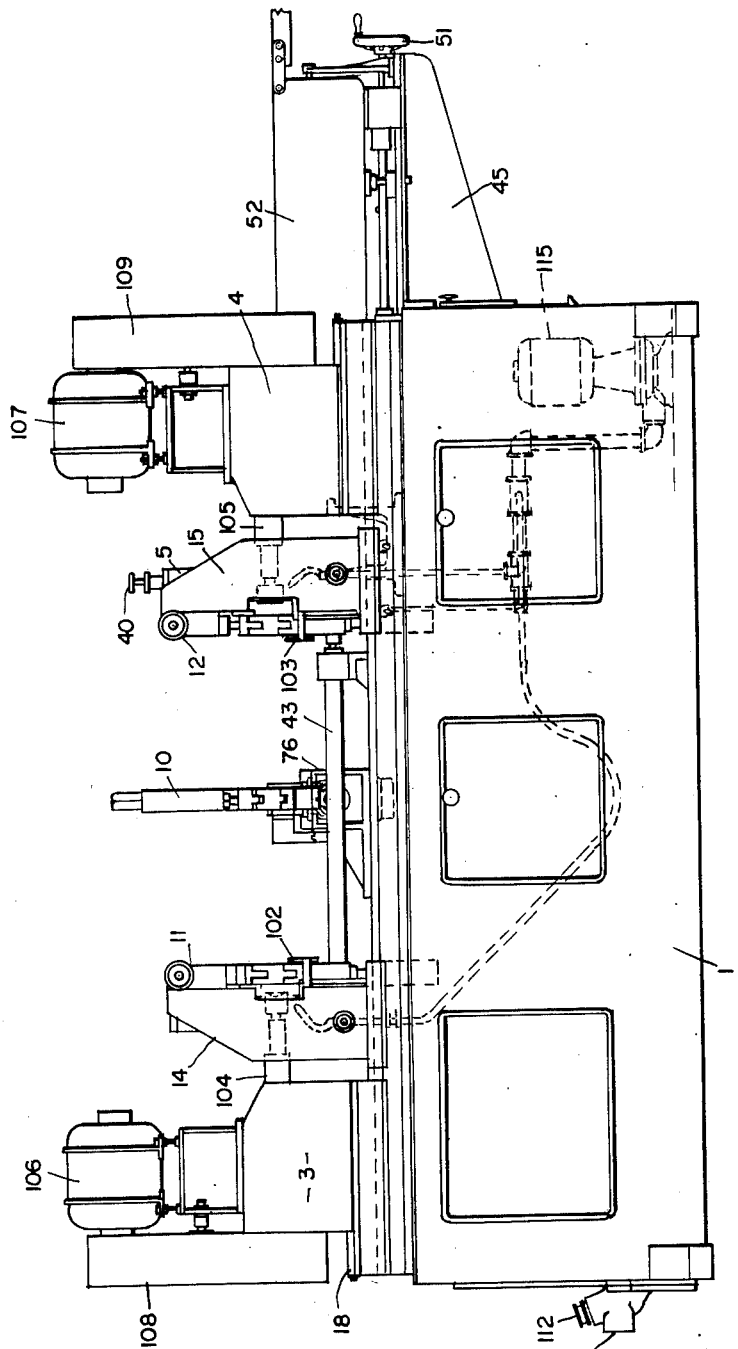

INVENTORS
HOWARD E. ROSE AND
MERRITT B. SAMPSON
BY
Oberlin & Limbach
ATTORNEYS.

May 26, 1953   H. E. ROSE ET AL   2,639,493
TRANSFER MACHINE

Filed March 12, 1948   14 Sheets-Sheet 8

INVENTORS
HOWARD E. ROSE AND
BY  MERRITT B. SAMPSON

Oberlin + Limbach
ATTORNEYS.

INVENTORS
HOWARD E. ROSE AND
MERRITT B. SAMPSON
BY Oberlin & Limbach
ATTORNEYS.

INVENTORS
HOWARD E. ROSE AND
MERRITT B. SAMPSON
BY Oberlin & Limbach
ATTORNEYS.

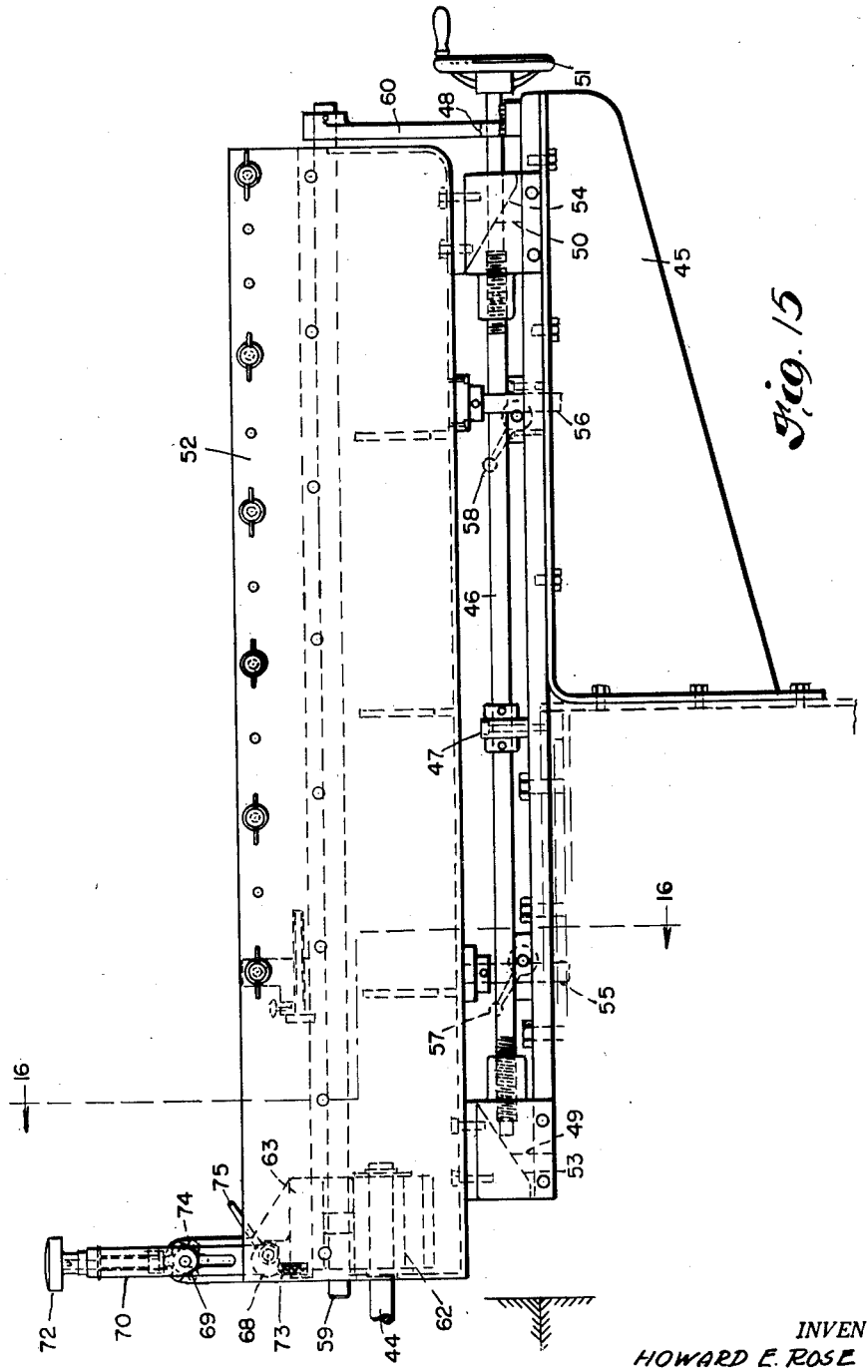

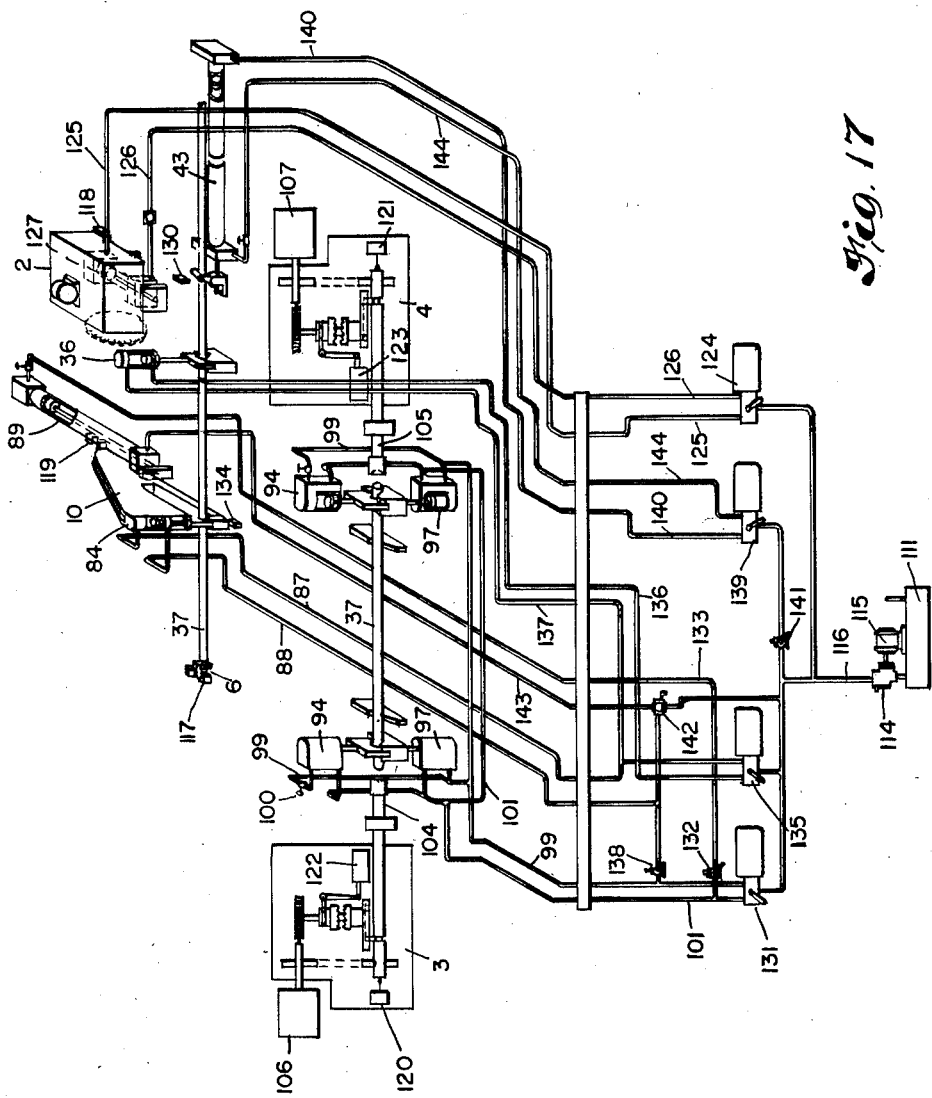

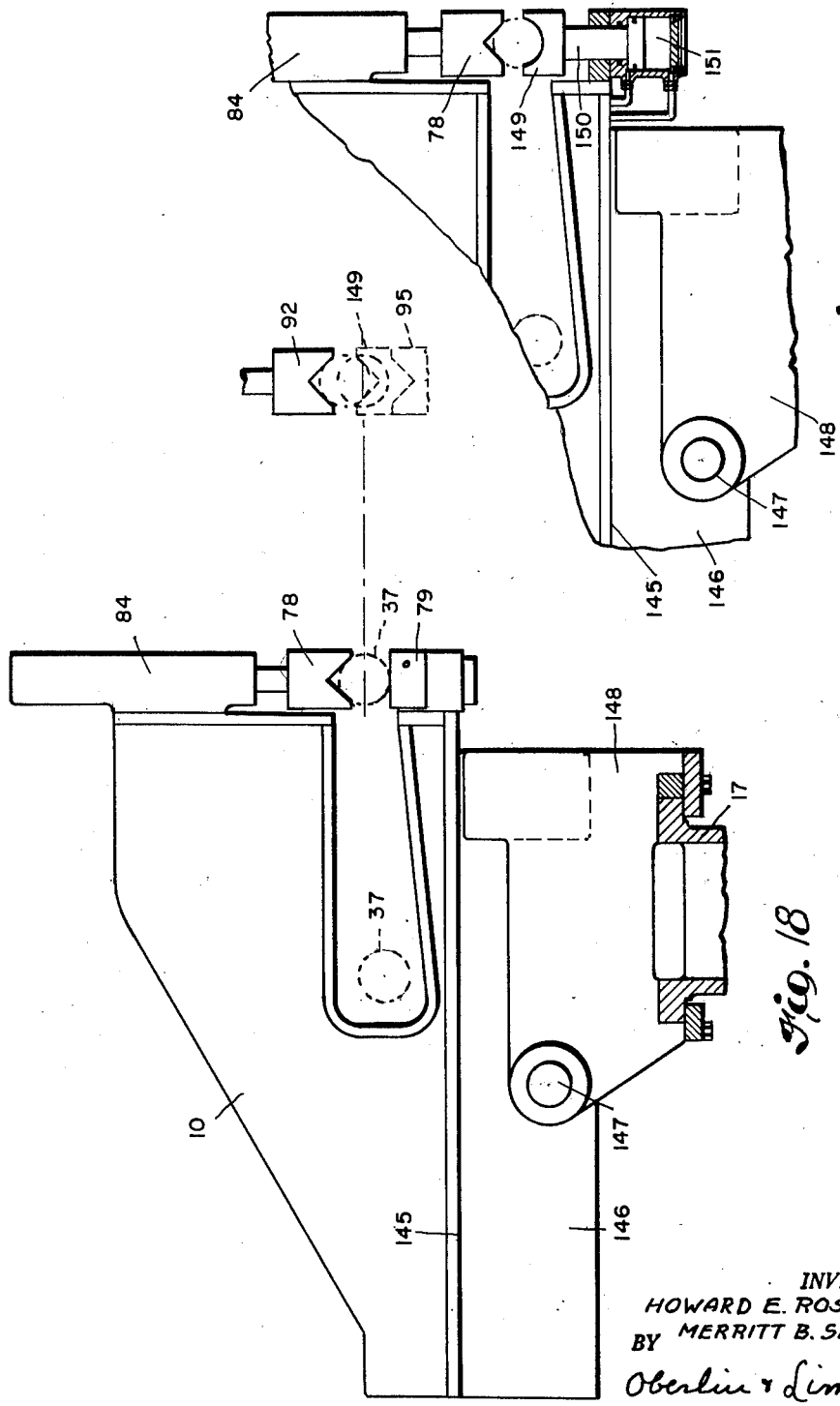

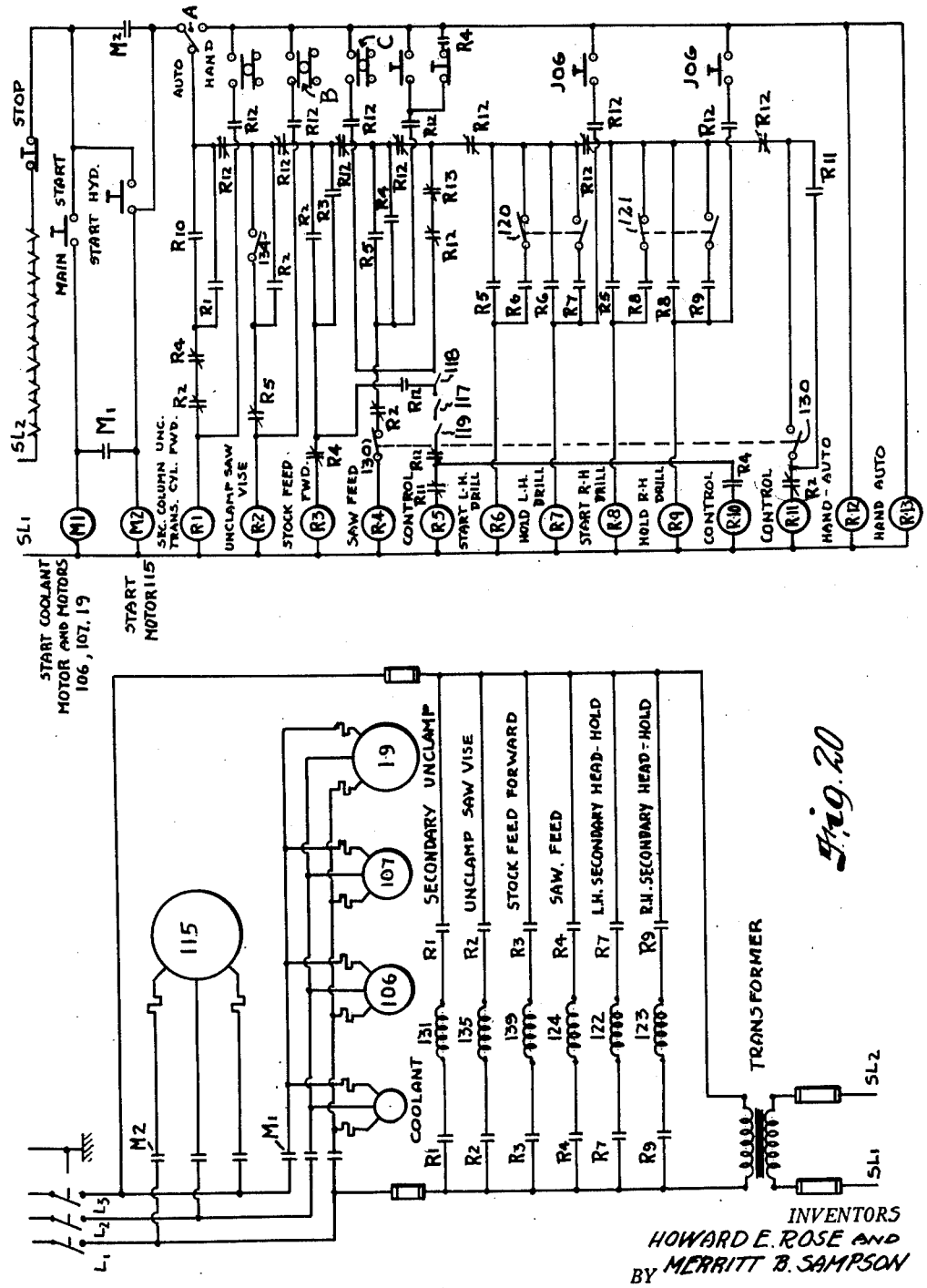

Patented May 26, 1953

2,639,493

UNITED STATES PATENT OFFICE 2,639,493

TRANSFER MACHINE

Howard E. Rose, Peninsula, and Merritt B. Sampson, Lakewood, Ohio, assignors to The Motch & Merryweather Machinery Company, Cleveland, Ohio, a corporation of Ohio Application March 12, 1948, Serial No. 14,404

15 Claims. (Cl. 29—51)

This invention relates as indicated to a transfer machine and more particularly to a machine of a type in which sections are cut from a continuous length of stock and such cut off sections then transferred to a second station for the performance of a further operation thereon. More particularly the invention is concerned with a machine for automatically cutting off sections of bar stock or the like and mechanically transferring such sections to a second station where such additional operation is performed.

The screw machine is a well-known example of a machine in which a variety of operations may be performed upon the end portion of a continuous length of rodding, for example, and such end portion then cut off and discharged from the machine. There are, however, many products which require the performance of operations on each end thereof so that both such operations can be performed only after the work-piece has been severed from the length of stock. It has been standard practice to cut such work-pieces from the stock by means of an automatic sawing machine or the like and then to transport such cut off pieces to a separate machine where the necessary further operations are then performed. Due to the remarkable developments in recent years, both in cutting tools and in the machine tools themselves, such tools are now capable of such greatly increased rates of production that the chief inefficiency encountered in their use is the time required for set-up and the time taken by the operator in inserting and removing work-pieces, indexing the machine, and the like. It is therefore a primary object of our invention to provide a machine adapted to cut off work-pieces from continuous lengths of bar stock or tubing, for example, which may be of relatively heavy gauge and then perform a variety of additional operations on such cut off work-piece without any intervention on the part of the operator of the machine.

A further object is to provide such a machine adapted to perform operations on each end of a work-piece, including internal operations such as drilling, for example.

Another object is to provide transfer mechanism which will be positive in its control of the work-piece to insure proper centering of the latter.

Another object is to provide work holding means which will be quickly adjustable without requiring removal or replacement of parts such as collets or the like.

Another object is to provide a machine in which an operation may be performed upon one end of a work-piece simultaneously with the severing of the other end of such work-piece from the stock.

Still another object is to provide means for automatically ejecting the finished work-piece from the machine.

Other objects of the invention will appear as the description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a top plan view of a machine constructed in accordance with our invention and provided with a tool for operating upon the end of the stock simultaneously with the severing of such stock by the metal cutting saw;

Fig. 2 is a front elevational view of such machine embodying our invention;

Fig. 3 is an end elevational view of such machine taken from the left on Figs. 1 and 2;

Fig. 4 is a front elevational view of a machine generally similar to that illustrated in Figs. 1 to 3 inclusive but providing for only two machining operations in addition to the cut-off;

Fig. 15 is an elevational view of the stock feed mechanism;

Fig. 17 is a diagrammatic layout of a hydraulic system for operating the machine automatically in proper sequence.

Fig. 18 is an elevational view of a modified form of work-piece transfer carriage;

Fig. 19 is a fragmentary view similar to Fig. 18 but showing a modified form of lower clamping jaw preferred under certain circumstances; and Fig. 20 is a diagrammatic wiring diagram of an electrical circuit for controlling operation of the hydraulic system.

General construction

Figure 5:
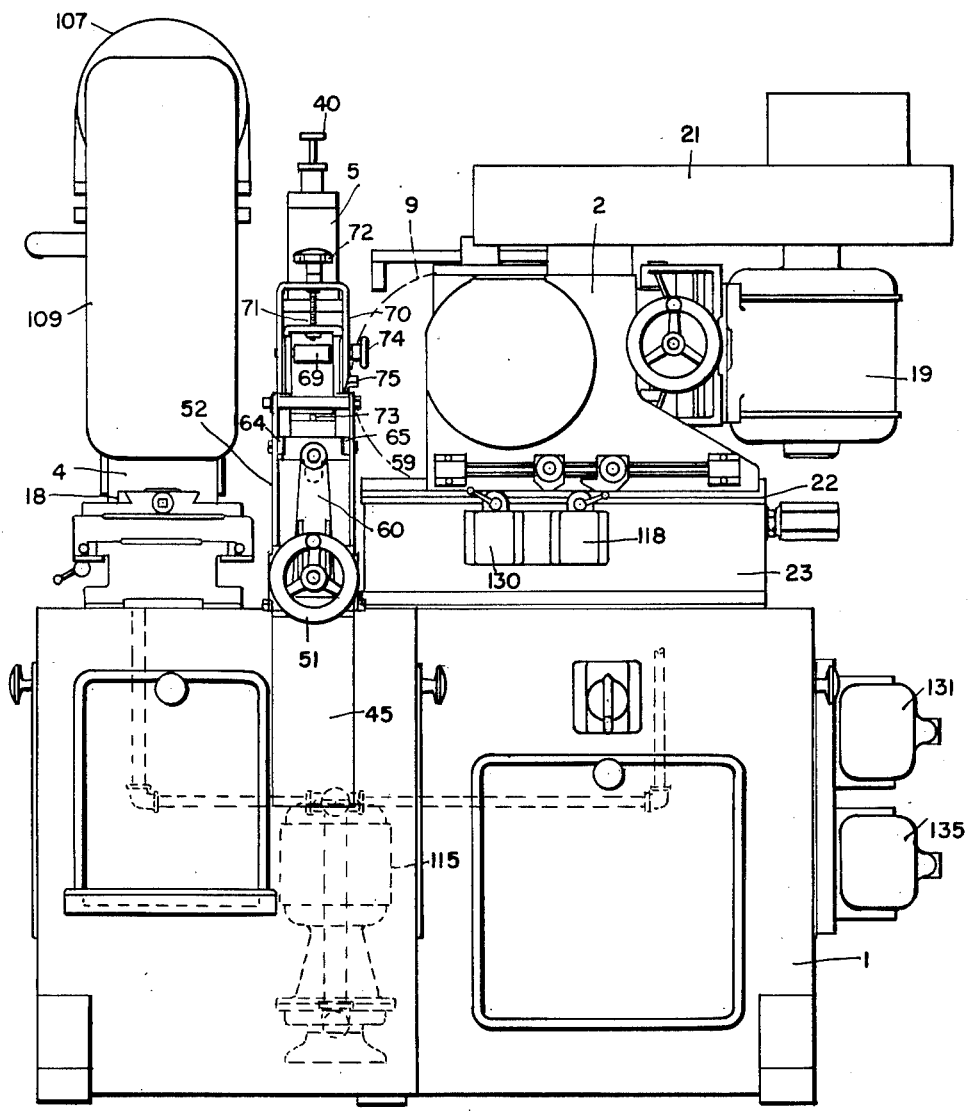
Fig. 5 is an elevational view of the right-hand end of such machine as shown in Fig. 4.

Referring now more particularly to such drawings and especially Figs. 1 to 6 thereof, the embodiment of our invention therein illustrated comprises a box frame 1 on which are mounted a metal cold sawing machine carriage 2 and a pair of opposed tool-carrying stands 3 and 4. A continuous length of stock such as bar stock or tubing is adapted to be advanced (from the right as viewed in Figs. 1 and 4) through stock vise or column clamp 5 which securely holds the stock curing the sawing operation. The end of the stock engages either a stock stop 6 supported by an adjustably positioned stand 7 (see Fig. 6), or else a stop on the face of stand 8 (see Fig. 1) when it is desired to perform a machining operation on such end at the same time that the piece is being cut off by the saw 9. A reciprocating transfer carriage 10 is operative as indicated in dotted line in Fig. 1 to transfer the cut off work-piece to a second station where such work-piece is held by a pair of secondary clamps 11 and 12.

It will be seen from the foregoing that the machine of this invention is adapted to perform a plurality of operations on a piece of work which has first been cut from a continuous length of stock. Secondary operations may be performed on both ends of the work-piece, such secondary operations including drilling, center drilling, chamfering, chamfering outside diameter and inside diameter of tubing, internal and external threading, hollow milling and a variety of other operations including combinations of any of the aforementioned.

The saw carriage 2 and stock holding vise 5 are fixedly positioned on the bed relative to the longitudinal direction of the stock, although such saw carriage is of course adapted to be traversed to cut off such stock. The work-piece transfer carriage 10 and the tool stands 3, 4 and 13 are, however, adjustably positioned on ways parallel to the axis of the stock. Stands 8, 14 and 15 with their respective work-piece holding clamps 16, 11, and 12 are similarly adjustably mounted on the ways 17 and 18, as is stock stop stand 7, when such latter is employed.

Figure 6:
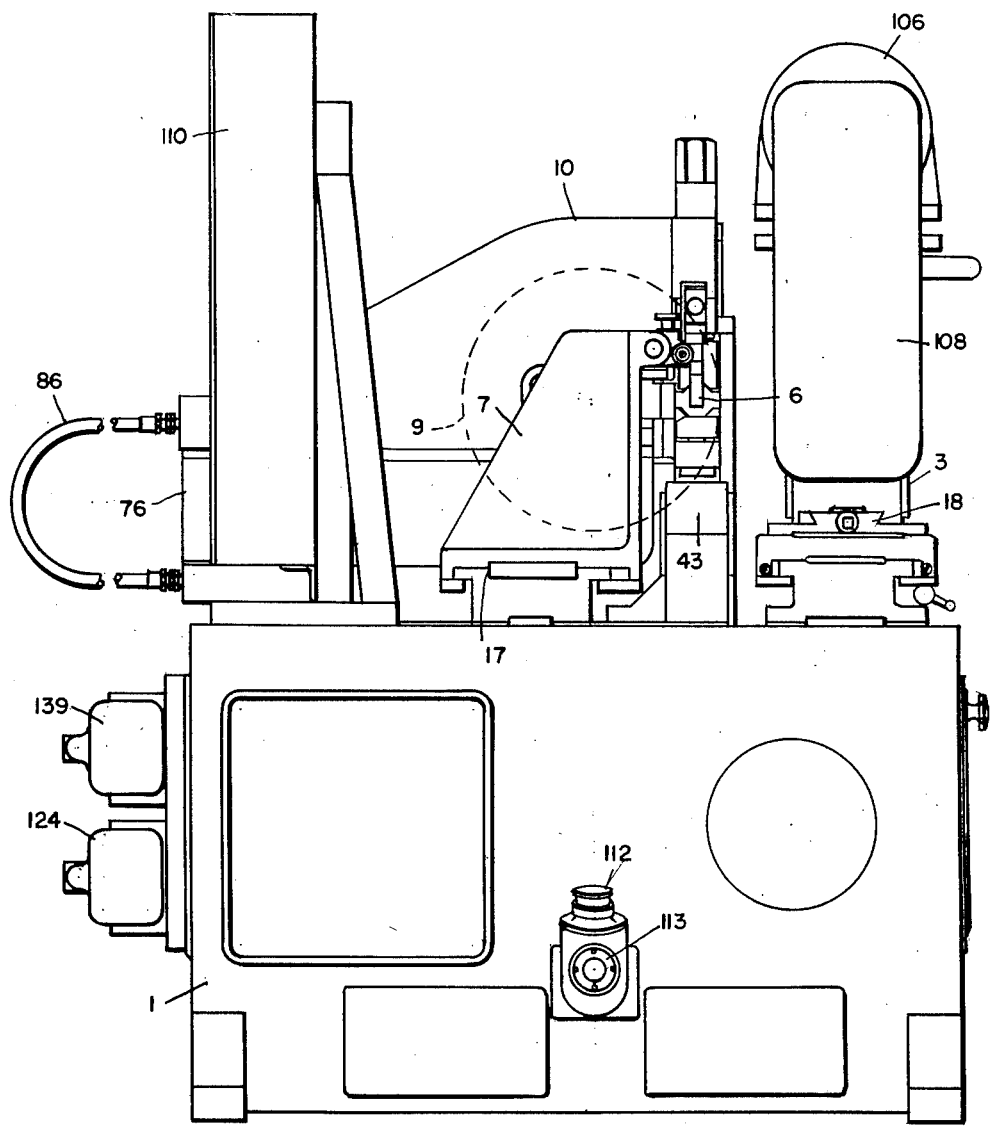
Fig. 6 is an elevational view of the left-hand end of such machine as shown in Fig. 4.

Figs. 1 to 3 inclusive show in semi-diagrammatic fashion the general relationship of the principal units comprising the machine, while Figs. 4 to 6 inclusive and the following detail figures illustrate more fully one preferred construction. Like parts have been identified by like numerals.

Saw carriage

Referring now particularly to Figs. 1, 2, 5, 8 and 9, the sawing machine which we employ may desirably be a cold metal sawing machine of the general type shown and described in Patent No. 2,327,920 to J. G. Moohl. While the precise construction of such sawing machine may vary, the machine as shown comprises a rotary disk saw 9 mounted on carriage 2 which is adapted to be reciprocated relative to base frame 1 in a manner more fully described below. Such saw is driven by an electric motor 19 pivotally mounted at 20 on such carriage for proper tensioning of belt drive 21, and through gearing (not shown) within the carriage. The saw carriage itself travels on ways 22 on supplemental frame 23 on base frame 1 whereby the saw may be traversed to engage and cut off the work. The manner in which such sawing machine is operated in timed relation to the operation of the stock feeding, stock transfer, and machining devices is explained below (see Operation). A star-wheel type chip-remover 24 is adjustably mounted at 25 to clear the saw teeth as the saw revolves and a coolant supply tube 26 is positioned to direct a stream of cutting oil onto the saw blade.

Stock vise

Figures 10, 11:
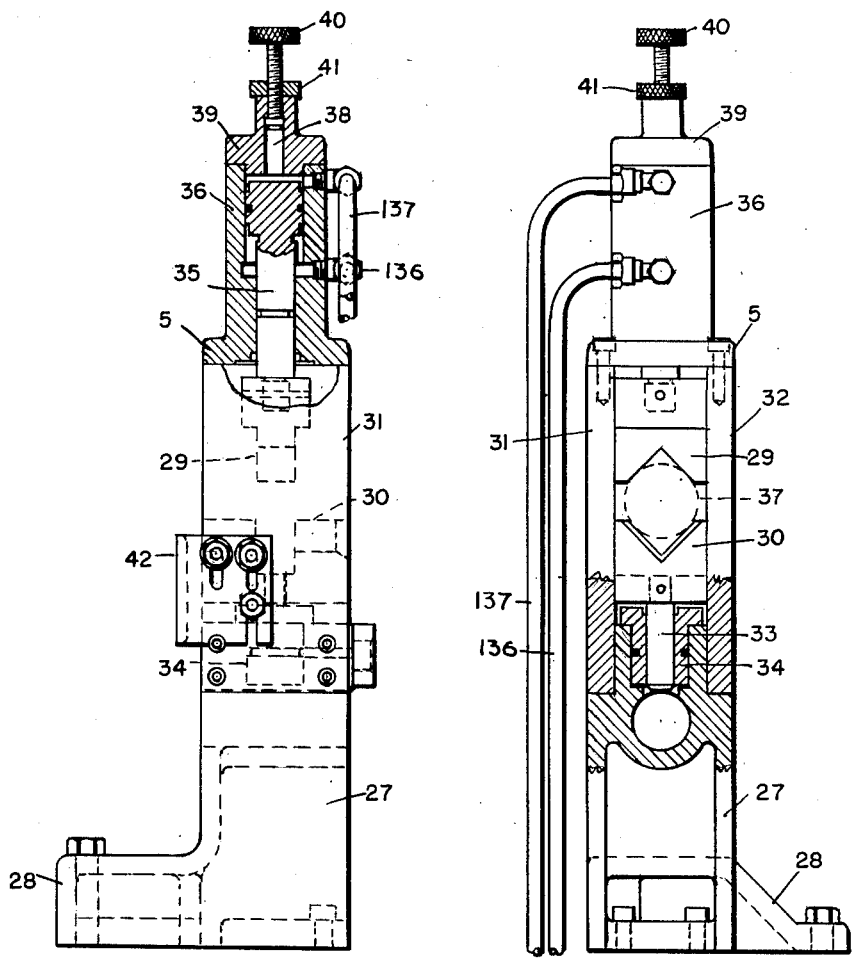
Fig. 10 is a front elevational view of the stock vise (partly broken away) which is adapted to clamp such stock adjacent the saw.
Fig. 11 is a side elevational view of such vise partly broken away to show the means for adjusting the lower jaw member thereof.
Figure 12:
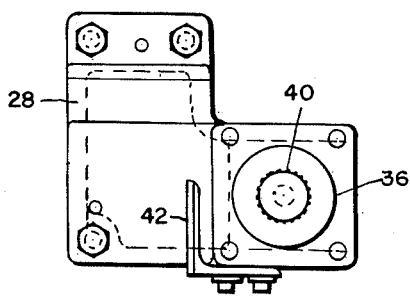
Fig. 12 is a top plan view of such vise.

The stock vise 5 which is generally indicated in Figs. 1 and 5, for example, is shown in detail in Figs. 10 to 12. It comprises a column 27 having an integral base 28 bolted to the main frame of the machine. Two opposed clamping jaws 29 and 30 are mounted for vertical reciprocation between laterally spaced upper extensions 31 and 32 of such column. Lower jaw 30 is secured to a post 33 which is threaded into a rotatable outer sleeve support 34. By rotating such sleeve jaw 30 may thus be raised or lowered to ensure proper centering of the work-piece. Upper jaw 29 is adjustably attached to piston 35 of hydraulic cylinder 36 and is adapted to be reciprocated therewith to clamp and unclamp the stock 37. Plunger 38 in the upper cylinder head 39 may be adjustably positioned by means of knurled knob 40 to limit upward movement of piston 35 to that required to release the stock clamped between jaws 29 and 30. Knurled lock nut 41 operates to maintain such adjustment.

A bracket 42 is mounted on the column below lower jaw 30 for vertical adjustment to support the stock on the other side of the saw blade from such clamping jaws. This aids in eliminating vibration or chatter, particularly during final completion of the cut.

Stock feed mechanism

Various forms of stock feed mechanism may be employed, including that described in the application of Lee W. McClellan, Frank J. Holberger and Howard E. Rose, Ser. No. 698,788, filed September 23, 1946. The form shown in Figs. 4, 5, 15 and 16 herein comprises a hydraulic cylinder 43, the piston 44 of which is connected to a serrated cam gripper device adapted to seize the stock and advance the same.

A heavy bracket or extension 45 is secured with bolts or by welding to main frame 1 and a shaft 46 is journalled for rotation in bearings 47 and 48 thereon. Sliding blocks 49 and 50 having oppositely inclined upper surfaces are threadably secured on shaft 46, one with a right-hand thread and the other with a left-hand thread, so that upon rotation of such shaft by means of handwheel 51 the blocks will be caused to move toward and away from each other. A channelform frame 52 of welded construction is supported on blocks 53 and 54 having under faces inclined to engage the upper inclined faces of blocks 49 and 50. When such latter blocks are shifted by rotation of wheel 51, frame 52 will therefore be correspondingly raised or lowered. Posts 55 and 56 are provided with eccentric cam locks 57 and 58 to lock such frame in adjusted position. A guide shaft 59 for the stock feed carriage is supported at one end by upright 60 and passes through bearing 61 in member 62 connected with piston 44.

A carriage 63 is secured to the end of piston 44 for reciprocation along slideways 64 and 65 within channelform frame 52. Mounted on said carriage is a superstructure comprising two spaced side members 66 and 67 having a serrated eccentric cam gripper 68 pivotally mounted therebetween on which the stock is adapted to rest and a roller 69 adapted to bear on the top of such stock. Such roller is carried in a yoke 70 which is vertically positioned by means of screw 71 and hand knob 72.

A spring-backed plunger 73 tends to rotate gripper 68 in a clockwise direction as shown in Fig. 15, thereby ensuring that the stock will be firmly seized when piston 44 reciprocates carriage 63 to the left to advance the same. Upon return of the carriage to the right, due to the eccentric shape of the gripper its hold on the stock is relaxed and it slides along freely until the carriage again moves to the left to advance the stock. Knob 74 on roller 69 and lever 75 on gripper 68 permit manual control of such gripping mechanism when setting up the machine.

Transfer carriage

When the stock has been fed through the jaws of column clamp 5 it is also gripped by the jaws of the transfer carriage 10 in readiness to advance the work-piece to the second work station when the saw 9 has severed the same from the stock.

Figure 7:
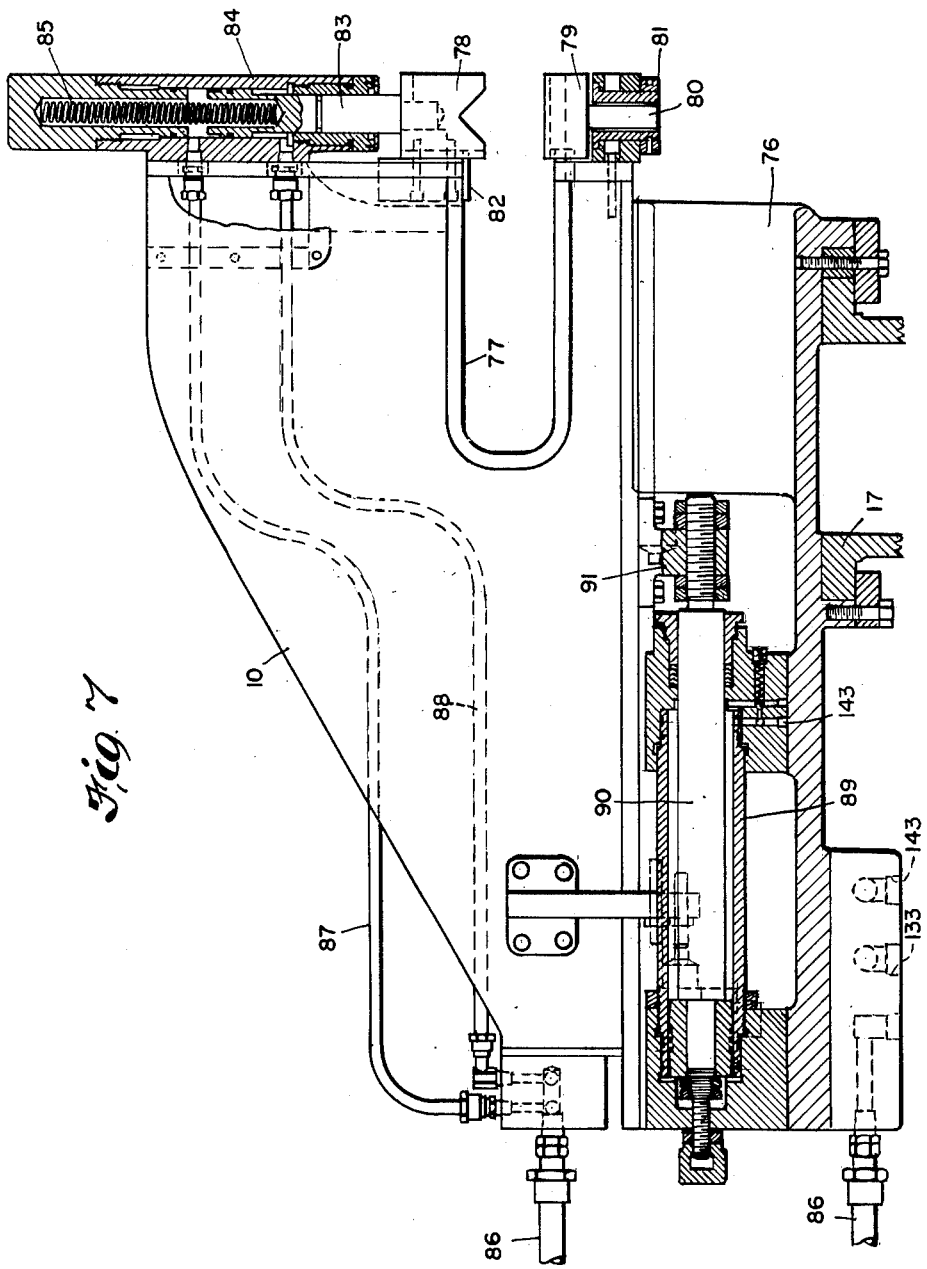
Fig. 7 is a detailed elevational view of the work-piece transfer carriage.
Figure 8:
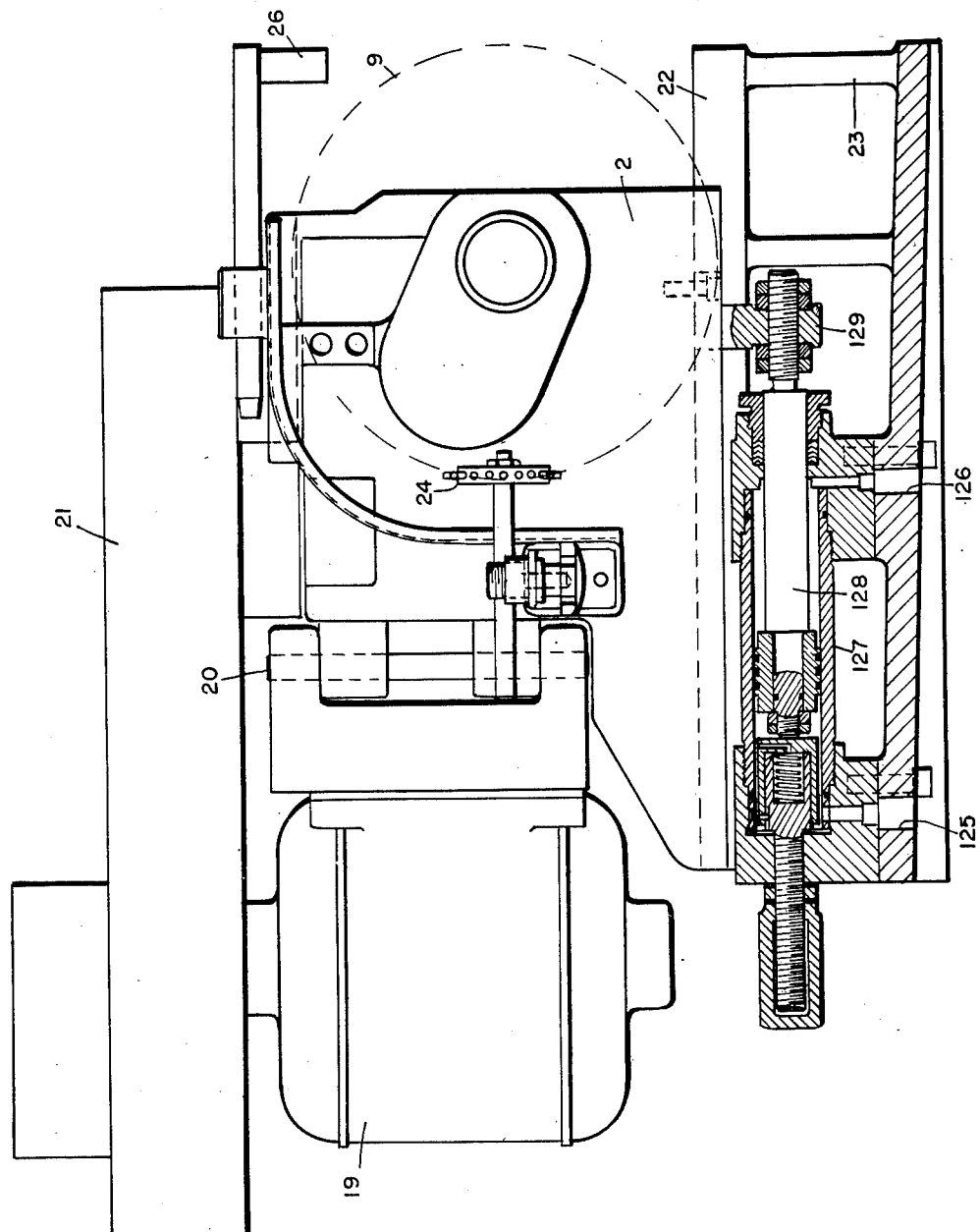
Fig. 8 is a side elevational view of the saw carriage.
Figure 9:
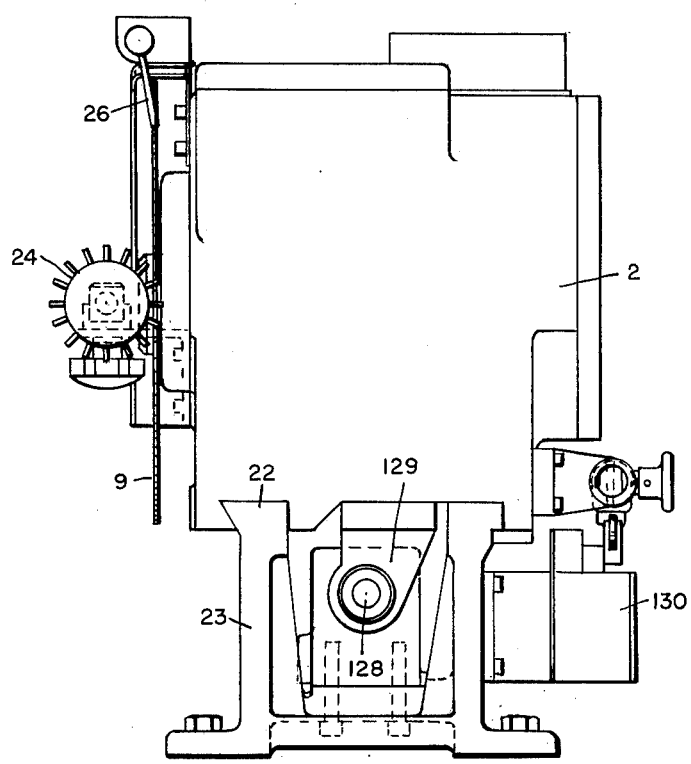
Fig. 9 is an end elevational view of such saw carriage.
Figure 16:
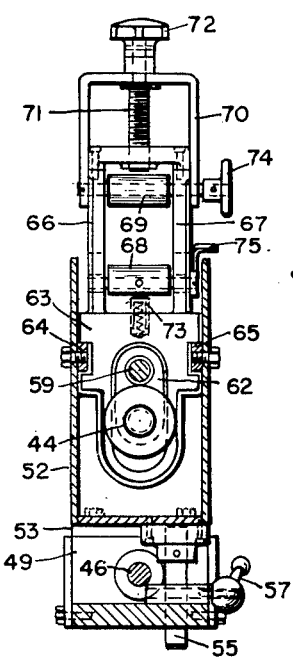
Fig. 16 is a vertical sectional view along the line 16—16 on Fig. 15 showing the stock feed carriage.

Such carriage 10 is mounted for reciprocation in base 76 which is in turn adapted to be adjustably positioned along ways 17 on the main frame or bed 1 (see Fig. 7). Normally it will be desired so to position such base on such ways that carriage 10 will be opposite the mid-point of the work-piece. The forward end of the carriage is deeply slotted at 77 to permit feeding of stock there-past even when the carriage is in advanced position. The work-piece clamping means of this carriage comprises an upper reciprocable jaw member 78 and a lower adjustable jaw member 79. Lower jaw 79 is carried on a post 80 threaded in rotatable sleeve 81 whereby such jaw may be raised or lowered. Upper jaw 78 is attached to a slide 82 in the face of carriage 10 and secured to a piston 83 in cylinder 84. A compression spring 85 bearing on such piston tends to force jaw 78 down into work clamping position. A pair of flexible pressure hose such as 86 connect conduits 87 and 88 from the respective ends of such cylinder to fluid pressure lines attached to base 76. Base 76 itself houses a fluid pressure cylinder 89 having a piston 90 attached to bracket 91 on carriage 10 and adapted to reciprocate such carriage on such base.

Secondary clamping means

Figure 13:
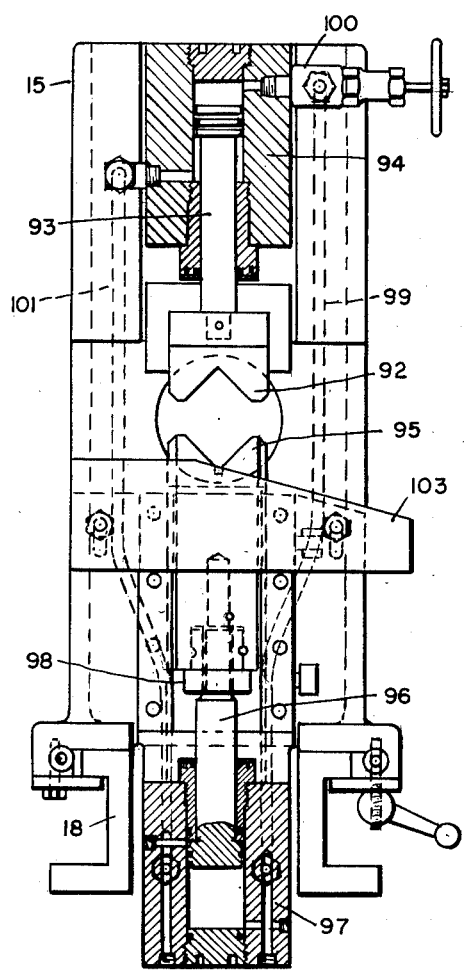
Fig. 13 is a side elevational view of one of the secondary work-piece clamping means.
Figure 14:
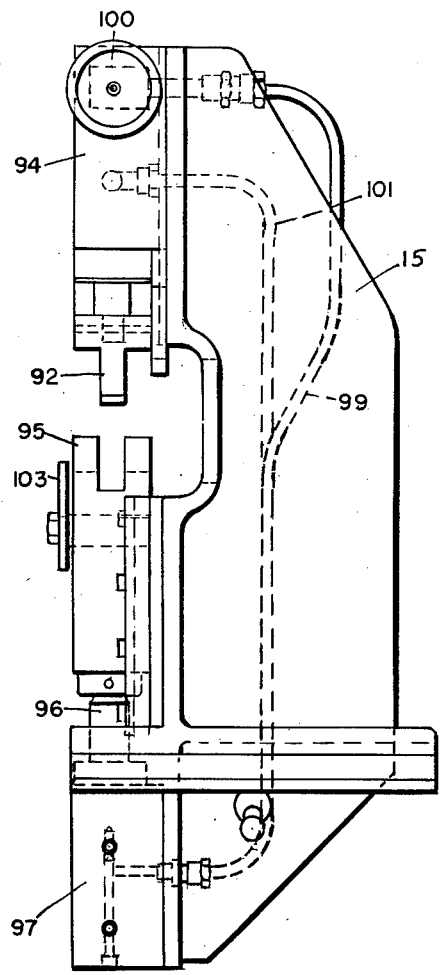
Fig. 14 is a front elevational view of such secondary clamping means.

Referring now more particularly to Figs. 13 and 14, there is there illustrated one of the pair of secondary clamping means 11 and 12 for holding the work-piece at the second work station. As above explained, such clamping means together with stands 14 and 15 are adapted to be adjustably positioned along ways 18. Only the one such clamping means will be described in detail, it being understood that the other is a mirror image thereof.

Upper jaw 92 is attached to piston 93 in upper cylinder 94 while lower jaw 95 is secured to piston 96 in lower cylinder 97. Centering of the work-piece relative to the tools is obtained by adjusting the threaded connection 98 between jaw 95 and piston 96. The upper end of cylinder 94 is connected to the lower end of cylinder 97 by fluid pressure conduit 99 but a valve 100 in such line causes piston 96 always to complete its full stroke before piston 93 has moved jaw 92 down into clamping position. Proper centering of the work-piece is thus assured. The lower end of cylinder 94 and the upper end of cylinder 97 are connected to fluid pressure line 101 so that when pressure is admitted thereto both clamping jaws will be retracted simultaneously.

When the jaws are thus retracted the work-piece will be left resting on inclined tracks 102 and 103 and will be discharged from the machine.

The tool-carrying spindles 104 and 105 are driven by electric motors 106 and 107 mounted on top of stands 3 and 4 respectively, with belt drives guarded by shields 108 and 109. If tool stand 13 and clamp 16 are employed in place of the simple stock stop 6 on stand 7 they will be of similar construction. The driving means may include cam mechanism whereby the tool is gradually fed into the work and then retracted, such mechanism being of standard design and available from manufacturers as a unit.

Control system and operation

The hydraulic system and the method of controlling the same will best be understood together with an explanation of the operation of the machine. Manual switches are located in control panel 110 (see Fig. 6) and hydraulic fluid is introduced to sump 111 through filler neck 112, gauge 113 registering the fluid level.

Reference may now be had to Figs. 17 and 20 which illustrate, respectively, the fluid pressure operating system and the electrical control circuit therefor. The control system is capable of selective manual or automatic operation, however, certain manual steps precede an automatic cycling operation. At the start of an operating cycle, the stock feed carriage will be in fully retracted position as will the saw carriage 2 and the transfer carriage 10, micro-switches 118 and 119, respectively associated with the two latter carriages, thereby being closed. The main start button is first actuated to energize the pump coolant motor, the spindle drive motors 106 and 107, and the saw drive motor 19, through relay contactors M1. Likewise, the electric motor 115 is energized by relay M2 to drive pump 114 and thus deliver fluid under pressure to the hydraulic line 116. All clamping means of the apparatus are normally connected to pressure line 116, and therefore will automatically move to clamping position when the system is energized.

Manually operated switch A is next moved to "hand" position to energize relays R12 and R13, thereby to place the several relay circuits in condition for hand controlled operation. Switch B is then closed to energize relay R2 which in turn operates solenoid valve 136 to open column clamp 5, by reversing the flow of fluid under pressure entering the cylinder 36, and the transfer clamp, by also reversing the fluid pressure in cylinder 84. The stock feed carriage is next caused to move forward by closing switch C to energize relay R3 and, through actuation of solenoid valve 139, to direct pressure behind piston 44 in cylinder 43 through the line 140.

The stock 37 is threaded through the stock feed gripper mechanism between cam gripper 68 and roller 69, and between the jaws 29 and 30 of column clamp 5, until it engages stop 6 where such engagement closes micro-switch 117. At this time, switch A is thrown to "automatic" position, thus deenergizing relays R12 and R13 and conditioning the control circuit for automatic operation. Since micro-switches 117, 118 and 119 are now closed, control relay R5 will immediately be energized and will trigger the circuits for relays R6 to R9, as well as complete the circuit to relay R4.

Energization of relay R4 causes solenoid valve 124 to operate to move saw carriage 2 forward by connecting line 125 with fluid pressure line 116 and line 126 to drain, while relays R7 and R9 respectively actuate solenoid valves 122 and 123 to connect the tool spindle feed means to the drive means therefor, thus moving spindles 104 and 105 forward. Movement of these spindles operates switches 120 and 121 to transfer control thereof from the starting relays R6 and R8 to the hold relays R7 and R9.

As saw carriage 2 moves forwardly, switch 118 will open to deenergize control relay R5 but the relays R4, R7 and R9, will stay energized since each is provided with an individual holding circuit. When the saw has advanced sufficiently to sever the stock, limit switch 130 operates to open the holding circuit for relay R4, thus stopping the saw feed by reversing solenoid valve 124. At this time, spindles 104 and 105 will have completed their cam controlled cycle and engaged switches 120 and 121 to break the holding circuits for relays R7 and R9, thereby to return spindle control to the start relays R6 and R8. The spindle drive is therefore disengaged and the spindles dwell in retracted position.

Closure of switch 130 also energizes control relay R11 which in turn readies the circuits of relays R10 and R1 for completion of the automatic cycle. When the return of saw carriage 2 closes switch 118, relays R10 and R1 are energized, the latter operating through solenoid valve 131 to unclamp the secondary column clamping means by reversing the pressure supplied to cylinders 94 and 97. A finished work-piece at such station thereupon rolls or slides down inclined tracks 102 and 103 (see Figs. 13 and 14) and is discharged from the machine.

When the pistons and cylinders 94 and 97 have completed the full extent of their movement, the pressure built up in line 101 overbalances pressure sequence valve 132 to admit fluid pressure to line 133 leading to transfer carriage cylinder 89. Piston 90 is thereupon caused to move to advance transfer carriage 10 on its bed 76 carrying the work-piece which has just been cut from the length of stock by the saw. As the transfer carriage moves away from switch 119, this switch will open, relay R1 remaining energized, however, through a holding circuit therefor. When such carriage has advanced to a point where the work-piece it carries is between the jaws 92 and 95 of the secondary clamping means, it strikes switch 134 operating solenoid valve 135 through relay R2 to admit fluid pressure to line 136 and connect line 137 to drain. Piston 35 is thereby reciprocated in cylinder 36 of column clamp 5 to release the stock to permit further feeding thereof. Since line 137, which is thus connected to drain, also communicates with line 87 leading to the upper end of transfer clamp cylinder 84 the upper end of such cylinder is likewise connected to drain.

Simultaneously with the above, the operation of relay R2 has broken the holding circuit of relay R1 and caused solenoid control valve 131 to be shifted back again to connect line 99 to pressure, thereby moving the pistons and cylinders 94 and 95 of the secondary clamping means to secure the clamp of the new work-piece brought to them by transfer carriage 10. Jaw 78 of the transfer carriage is still holding such workpiece at this point even though line 87 is connected to drain, as above explained, due to the action of spring 85, the weight of the jaw and piston 83, and the fact that there is a slight delay before the fluid pressure eases off entirely due to the restricted flow through the lines. See Fig. 7. (In fact, if the lines are small, spring 85 may be dispensed with entirely as the secondary clamping means can be caused to grasp quickly the work-piece before the pressure is entirely off the transfer clamp.) When the secondary clamping means have securely gripped the work-piece and the pistons can move no further in cylinders 94 and 97, pressure is built up in line 99 which overbalances pressure sequence valve 138, admitting fluid pressure to line 88 leading to the lower end of transfer clamp cylinder 84 and positively elevating jaw 78. The transfer carriage 10 is thus now free to return.

At the same time, actuation of relay R2 has also energized relay R3 to cause solenoid valve 139 to be shifted to connect line 140 to pressure supply line 116 through a pressure reducing valve 141. Piston 44 in feed cylinder 43 is thereby reciprocated to feed the stock through the jaws 29, 30 of column clamp 5 and against stock stop 6. The stock 37 passes through the slot 77 in transfer carriage 10 which, it will be recalled, is in advanced position. Closing of switch 117 effects no change at this time, merely setting up the circuit against the time when the other switches will be closed as described below. The pressure in feed cylinder 43 continues to urge the stock against stop 6.

When jaw 78 of transfer clamp cylinder 84 has been elevated to the fullest extent, insuring release of the workpiece to the secondary clamping means, pressure builds up in line 88 which operates pressure controlled valve 142 to admit pressure to line 143, shifting piston 90 in cylinder 89 to return transfer carriage 10 into position to clamp the stock newly fed through column clamp 5. Return of such carriage, of course, closes switch 119.

It will be seen now that switches 119, 118, 117, 120 and 121 have all been operated and a new cycle has been begun, solenoid valve 135 being in its normal position connecting lines 87 and 137 to pressure to close both the transfer clamp and the column clamp 5. It will be recalled that the lower end of transfer clamp cylinder 84 is still under pressure, but the area of the upper end of the piston head of piston 83 is greater than the area of the lower end so that the pressure differential is effective to reciprocate the same to cause jaw 78 to clamp the stock. The fluid in the lower end of cylinder 84 is forced out through valve 138 which permits flow in this direction. Line 136 from the column clamp cylinder 36 is, of course, connected to drain when valve 135 is thus shifted.

The operation of the five switches noted is also effective to energize relay R4 to shift solenoid valve 124 to connect line 125 to pressure and line 126 to drain so that piston 128 is moved in cylinder 127 (see Fig. 8) to advance saw carriage 2. Since the column clamp and the transfer carriage clamp are closed almost at once, however, the stock is firmly held thereby before the advancing saw 8 engages it.

The operation of the five switches which thus causes the saw to advance also deenergizes relay R3 to cause shifting of solenoid valve 139 to connect line 144 to pressure and line 140 to drain. The stock feed gripper mechanism is therefore returned ready to again advance the stock. Since the jaws of column clamp 5 are mounted for vertical adjustment, it will be understood that upper jaw 29 is required to move only a short distance to clamp the stock. Accordingly no time delay means need be incorporated with solenoid control valve 139 to ensure that the stock is not momentarily left unsecured when the feed carriage starts back. Standard time delay devices are, of course, available and may be employed here and elsewhere in the circuit as a safety measure if desired. They have not, however, proven to be necessary in actual operation. The cycle now continues, and is repeated as above described until the stock is exhausted.

It will now be seen that we have provided a machine in which work-pieces are automatically cut from continuous lengths of stock and transferred to a second station where further operations are performed thereon simultaneously with the severing of another piece. At no time from severing to discharge of the piece is it released from the grip of some clamping means which ensures proper indexing and centering thereof. The cut-off work-piece is transferred laterally to the second work station in such manner as not to interfere with the further feeding of stock past the sawing machine. Consequently, not only are the cut-off and machining operations performed simultaneously, but also the stock feed and transfer operations are simultaneous. The high production thus obtained makes for maximum use of the tools and minimum use of the operator. The machine is adapted to handle a wide variety of sizes of bar stock, tubing, and the like and to perform many combinations of operations thereon. As above indicated, a tool stand 13 and clamping means 16 may be employed instead of the simple stock stop, thereby providing yet another operation.

Figs. 18 and 19 show a somewhat modified form of transfer carriage 10. In this embodiment such carriage also is adapted to reciprocate along ways 145 on support 146 to transport a cut-off work-piece 37 to the secondary clamping means. Support 146 is pivotally mounted at 147 in base member 148, such base being adjustably positioned on ways 17 in the same manner as base 76 (see Fig. 7). The center of gravity of carriage 10 is sufficiently far forward (to the right in Fig. 18) that support 145 must be positively rotated in a counterclockwise direction and tends to rest in level position against base 148, which limits its clockwise pivotal movement.

The method of handling the stock previously described is particularly adapted to transport the work-piece at a constant level, thereby simplifying mechanical movements and facilitating centering. Lower jaw 79 of the stock transfer clamp is shown as a flat table to permit direct withdrawal of the transfer carriage after such work-piece has been gripped by the secondary clamping jaws and upper jaw 78 raised. Under some circumstances, however, a different arrangement is preferred. When the stock comprises thin-walled tubing, a curved lower clamping jaw such as 149 may be employed to adequately support the tubing and prevent buckling. Such jaw may be carried by a piston 150 reciprocable in cylinder 151 connected in the hydraulic system to be advanced and retracted in synchronism with jaw 78.

When thus modified, upper jaws 92 of the secondary clamping means may be fixedly positioned to properly center the work-piece when the latter is elevated into engagement therewith by lower jaws 95 (see also Fig. 13). Since it is desired that the transfer carriage clamp continue to positively hold the work-piece until the secondary clamping means has taken hold, the forward end of transfer carriage 10 will be elevated therewith, pivoting at 147. Jaw 78 of the transfer clamp is then retracted sufficiently to permit such carriage to return to level position and also to clear the work-piece. If flat lower jaw 79 is employed the carriage may now return along ways 145. If a lower jaw such as 149 is employed, on the other hand, it may be necessary also to retract such jaw to clear the work-piece before thus returning the carriage. It will be appreciated, of course, that the work-piece will ordinarily have been raised only a short distance before engaging upper jaw 92 of the secondary clamping means.

Not only does the above-described modification permit the employment of a formed lower jaw for the transfer clamp but also the two upper cylinders of the secondary clamping means may be dispensed with, with some saving in expense. Movements of the parts may be quite rapid to obtain maximum efficiency of operation.

Actually, the number of work stations is a matter of choice since the upper and lower jaw carrying portions of the transfer carriage may be extended to provide for a series of spaced pairs of clamping jaws, the work-pieces at each station being advanced to the next by a single reciprocation of such carriage. Also, instead of feeding a continuous length of stock, shorter work-pieces such as forgings requiring a trimming operation may be fed sequentially to the cut-off and transfer means. A cold metal sawing machine gives a clean-milled cut which permits immediate transfer for a second operation on such cut-off end such as center-drilling. The side delivery feature permits a single operator to observe both feed and delivery sides of the machine. Since the tool spindles (saw, drills, etc.) are driven continuously there is lost time during cycling and it is an important object of this invention to reduce cycle time to a minimum by performing as many operations simultaneously as possible. Relatively short and simple mechanical movements and positive indexing also assist to this end. Thus, the clamping jaws are set to move a minimum distance and the work-piece is never "loose" but always securely clamped at all stages of the operation.

The machine of this invention is versatile in the type of work-piece it can handle, including channels, round tube, square tube, round bar, hex bar, rails, etc. The feed mechanism, saw, and transfer mechanism will all accommodate a large variety of both shapes and sizes, although modified clamping jaws may occasionally be desirable. The fact that the transfer carriage clamp grips the stock as well as the column clamp during the sawing operation is particularly advantageous when a long length of stock is to be severed. Since the cut-off work-piece is transferred laterally it is possible to employ a fixed stock stop for the stock feed past the saw instead of the common type of stop which must be swung out of the way to permit axial delivery of such work-piece.

Not only may the new stock be fed past the saw simultaneously with movement of the transfer carriage but also the machining operations at the second work station may be prolonged while such transfer means is advancing and resumed while the transfer means is returning. This may be an appreciable advantage where the work-piece is large and heavy and the movement of the transfer means consequently relatively slow. Such operation is in marked contrast to conventional machines wherein all machining operations cease during cycling. Since the work stations are independently mounted there is no cumulative error in indexing, and vibrations of tools at one station are less likely to affect other stations.

Other modes of applying the principle of the invention may be employed, change being made as regards the details described, provided the features stated in any of the following claims or the equivalent of such be employed.

We therefore particularly point out and distinctly claim as our invention:

1. In combination with an automatic sawing machine, means automatically operative intermittently to feed a continuous length of stock into position to be cut off by the saw of such machine at a first station, means automatically operative to clamp such stock during the sawing operation, a power-driven tool adapted to operate on the section of stock extending past such saw simultaneously with such cut-off operation, two power-driven tools at a second station spaced laterally from said clamping means, said two tools being relatively axially spaced to receive a cut-off section of stock therebetween, clamping means at such second station adjacent said two tools adapted to hold such section during operations on the end portions thereof, a transfer carriage mounted for reciprocation between such first station and such second station, and clamping means on said carriage operative to clamp such stock continuously during the sawing operation and during transfer of the cut-off section to such second station, the said clamping means at such second station being operative to clamp such section prior to release of such section by said clamping means on said carriage.

2. In combination with an automatic sawing machine, means automatically operative intermittently to feed a continuous length of stock into position to be cut off by the saw of such machine at a first work station, means automatically operative to clamp such stock during the sawing operation, two power-driven tools at a second station spaced laterally from said clamping means, said two tools being relatively axially spaced to receive a cut-off section of stock therebetween, clamping means at such second station adjacent said two tools adapted to hold such section during the performance of operations thereon, a transfer carriage mounted for reciprocation between such first station and such second station, and clamping means on said carriage operative to clamp such stock continuously during the sawing operation and during transfer of the cut-off section to such second station, the said clamping means at such second station being operative to clamp such section prior to release of such section by said clamping means on said carriage.

3. In combination with an automatic sawing machine, means automatically operative intermittently to feed a length of stock into position to be cut off thereby, a power driven tool adapted to operate on the end of the section of stock extending past such saw during such cut-off operation, transfer means reciprocable toward and away from a second work station, clamping means on said transfer means adapted to hold such section of stock intermediate its ends during such cut-off operation, clamping means at such second station adapted to receive such section of stock from said transfer means, and power driven tools at such second station adapted to operate on the end portions of such transferred section while another section of stock is being cut off by such sawing machine, said stock feed means being operative to advance such stock during reciprocation of said transfer means.

4. In combination with an automatic sawing machine, a stock transfer carriage, means on said carriage operative to clamp a portion of such stock during the sawing operation, means operative to reciprocate said carriage after completion of a sawing operation to transfer a cut-off section of stock thus held by said clamping means on said carriage laterally to a second work station, and clamping means at such second station operative to securely clamp such stock prior to the release thereof by said clamping means on said carriage.

5. In combination with an automatic sawing machine, a stock transfer carriage, means on said carriage operative to clamp such stock during the sawing operation, means operative to reciprocate said carriage to transfer a cut-off section of stock laterally to a second work station, a pivotal mounting for said carriage parallel to the axis of such stock carried thereby, and clamping means at such second station operative to securely clamp such stock prior to the release thereof by said clamping means on said carriage, said clamping means at such second station comprising a fixed upper jaw member and a corresponding lower jaw member movable thereto ward to engage and lift such stock into clamping engagement therebetween with resultant pivotal movement of said carriage.

6. In combination with an automatic sawing machine, means operative intermittently to feed a continuous length of stock into position to be cut off by the saw of such machine at a first station, means automatically operative to clamp the section of such stock extending past such saw during the sawing operation, a power driven tool adapted to operate on the section of stock extending past such saw simultaneously with such cut-off operation, and means adapted to reciprocate said clamping means in a straight line to deliver such cut-off and machined section of stock laterally from said first station.

7. In combination with an automatic sawing machine, a stock transfer carriage, means on said carriage operative to clamp such stock during the sawing operation, means operative to reciprocate said carriage in a straight line path to transfer a cut-off section of stock laterally to a second work-station, and a pivotal mounting for said carriage parallel to the axis of such stock carried thereby, whereby such stock may be elevated at such second station prior to release thereof by said clamping means on said carriage, with said carriage swinging about said pivotal mounting to accommodate such elevation of such stock.

8. In combination with automatic cut-off means, a stock transfer carriage, means on said carriage operative to clamp such stock, means operative bodily to reciprocate said carriage to transfer the cut-off stock laterally from said cut-off means to a second work station, said clamping means being mounted for supplemental upward movement whereby such stock may be elevated, and further clamping means at such second work station operative to engage such stock prior to release thereof by said clamping means on said carriage and to raise and clamp such stock in elevated position, said clamping means on said carriage moving upwardly with such stock.

9. In combination with an automatic sawing machine, a stock transfer carriage, means on said carriage operative to clamp such stock during the sawing operation, means operative to reciprocate said carriage to transfer a cut-off section of stock laterally to a second work station, clamping means at such second station operative to securely clamp such stock prior to the release thereof by said clamping means on said carriage, said clamping means at such second station comprising a fixed upper jaw member and a corresponding lower jaw member movable theretoward to clamp such stock therebetween, and an inclined discharge guide-way therebelow, said lower jaw being downwardly movable below said guide-way to cause such stock to engage the same and be delivered from the machine.

10. In combination with an automatic sawing machine, means operative to transfer a cut-off work-piece to a second work station, clamping means at such station comprising a fixed upper jaw member and a lower jaw member movable theretoward to clamp such stock therebetween, and an inclined discharge guide-way therebelow, said lower jaw being downwardly movable below said guide-way to cause such work-piece to engage the same and be delivered from the machine.

11. A work station comprising means operative to clamp a work-piece intermediate its ends, power driven tools mounted to operate on the respective ends of such work-piece thus clamped, and inclined discharge means located below said clamping means, said clamping means including a lower jaw member of general V-shape downwardly movable below said discharge means to deliver such work-piece to said discharge means.

12. A work station comprising means operative to clamp a work-piece intermediate its ends, power driven tools mounted to operate on the respective ends of such work-piece thus clamped, and inclined discharge means located below said clamping means, said clamping means including a lower jaw member downwardly movable below said discharge means to deliver such work-piece to said discharge means.

13. In combination with an automatic sawing machine, a stock transfer carriage mounted for reciprocation laterally of said machine, clamping means on said carriage operative to clamp the portion of stock to be cut off by said machine, and means operative to reciprocate said carriage, said carriage having an opening therethrough extending rearwardly from said clamping means sufficient to permit further feeding of stock into cut-off position during reciprocation of said carriage and return of said clamping means to engage such newly fed stock.

14. In a machine tool having a first work station, means operative to feed elongated stock thereto, a second work station laterally of said first work station, and stock transfer means mounted for reciprocation transversely of the path of feeding of such stock at said first work station operative to transfer stock from said first station to said second station; said transfer means comprising a carriage, and stock clamping means on said carriage having opposed jaws adapted to grip such stock, said carriage having an opening therethrough extending rearwardly from said clamping means sufficient to permit further feeding of stock at said first station during reciprocation of said carriage and return of said jaws to engage such newly fed stock.

15. In combination with cut-off means, workpiece transfer means operative at the cut-off station securely to clamp a work-piece during cutting off of the latter from a length of stock by said cut-off means, means operative to reciprocate said transfer means laterally in a substantially straight line to transfer the cut-off work-piece to a second work station and to return said transfer means to such cut-off station to clamp a further section of such stock for cutting off, and feed means operative to advance a further section of such stock past said cut-off means into position for cutting off during such reciprocation of said transfer means, said transfer means being shaped to avoid mechanical interference with such newly fed section of stock during such reciprocation.

HOWARD E. ROSE.
MERRITT B. SAMPSON.

References Cited in the file of this patent
UNITED STATES PATENTS

| Number | Name | Date |
|---|---|---|
| 532,692 | Newton | Jan. 15, 1895 |
| 1,198,797 | Waterman | Sept. 19, 1916 |
| 1,495,234 | Reilly et al. | May 27, 1924 |
| 1,592,009 | Simpson | July 13, 1926 |
| 1,894,526 | Wilcox | Jan. 17, 1933 |
| 2,376,654 | Braendel et al. | May 22, 1945 |
| 2,411,110 | Pruitt | Nov. 12, 1946 |